United States Patent [19]

Geisel

[11] 3,788,035

[45] Jan. 29, 1974

[54] CAULKING CARTRIDGE FILLING AND SEAMING MACHINE

[75] Inventor: Charles E. Geisel, Crestwood, Mo.

[73] Assignee: Container Corporation of America, Chicago, Ill.

[22] Filed: June 21, 1972

[21] Appl. No.: 264,929

Related U.S. Application Data

[63] Continuation of Ser. No. 83,820, Oct. 26, 1970, abandoned.

[52] U.S. Cl. .................................................. 53/282
[51] Int. Cl. ......................... B65b 3/00, B65b 25/00
[58] Field of Search............ 53/202, 266, 281–283, 53/306, 319, 328, 330, 366, 37; 141/113, 167, 171–175, 281; 29/208 B; 206/56 R, 56 G; 222/327

[56] References Cited
UNITED STATES PATENTS

| | | |
|---|---|---|
| 3,503,182 | 3/1970 | Phipps .................................. 53/282 |
| 2,106,577 | 1/1938 | Sherbondy ....................... 206/56 G |
| 2,162,464 | 6/1939 | Soderberg ............................ 53/281 |
| 2,310,413 | 2/1943 | Friden .................................. 53/282 |
| 3,293,823 | 12/1966 | Anderson ......................... 53/282 X |
| 2,127,974 | 8/1938 | Johnson ............................ 53/282 X |
| 2,691,474 | 10/1954 | Olson ............................... 206/56 R |
| 3,599,389 | 8/1971 | Hartman .......................... 53/266 X |

*Primary Examiner*—Robert L. Spruill
*Attorney, Agent, or Firm*—Carpenter, Ostis & Lindberg

[57] ABSTRACT

Apparatus for filling empty caulking material cartridges movable in side-by-side rows along an endless conveyor and past a filling station and stations downstream therefrom where an extruding piston is placed on the cartridge tube and a ring is seamed to the opposite end of the cartridge tube. Structure is controlled by the power means for driving the endless conveyor for operation of means for loading the cartridge tubes on to the conveyor, seaming the tubes, and discharging the filled tubes from the conveyor.

7 Claims, 4 Drawing Figures

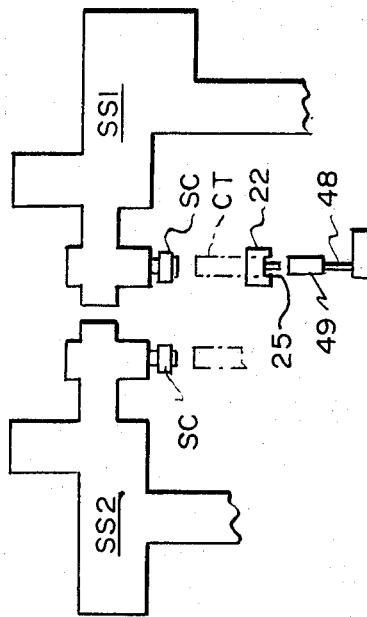
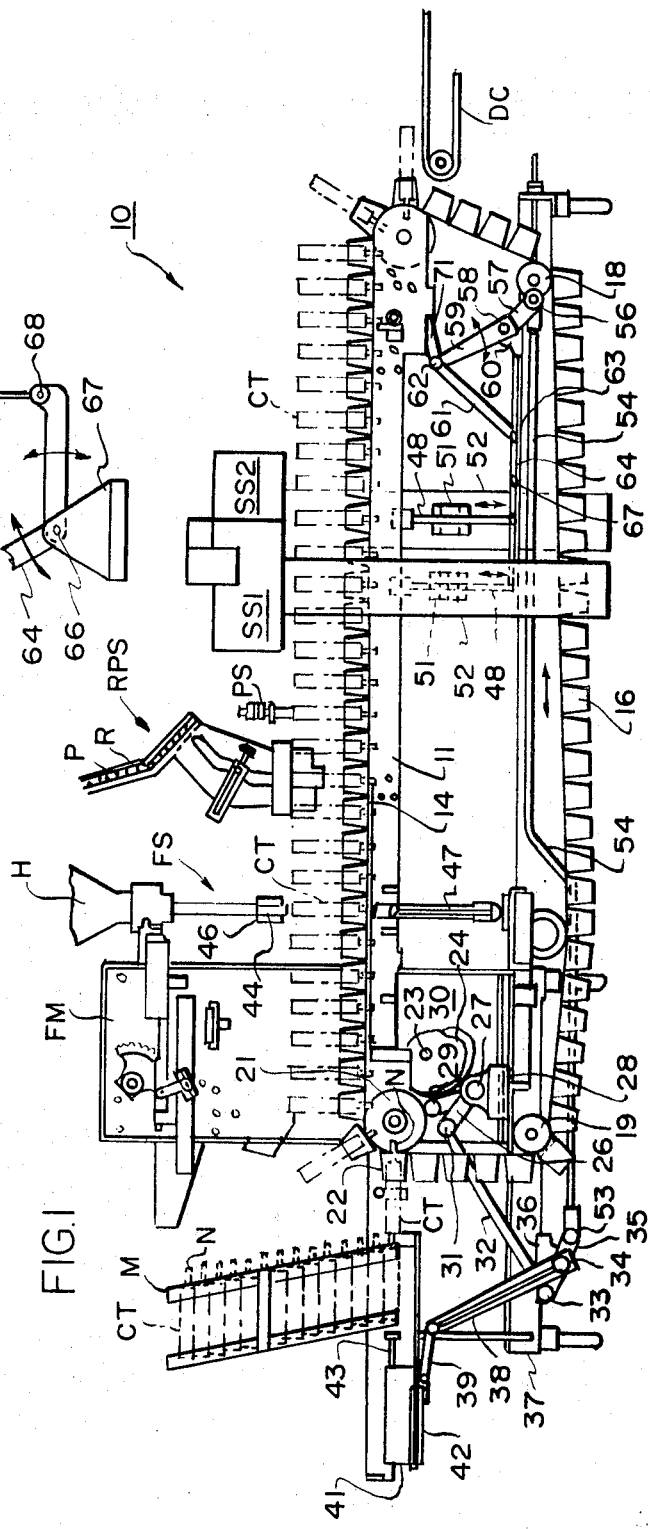

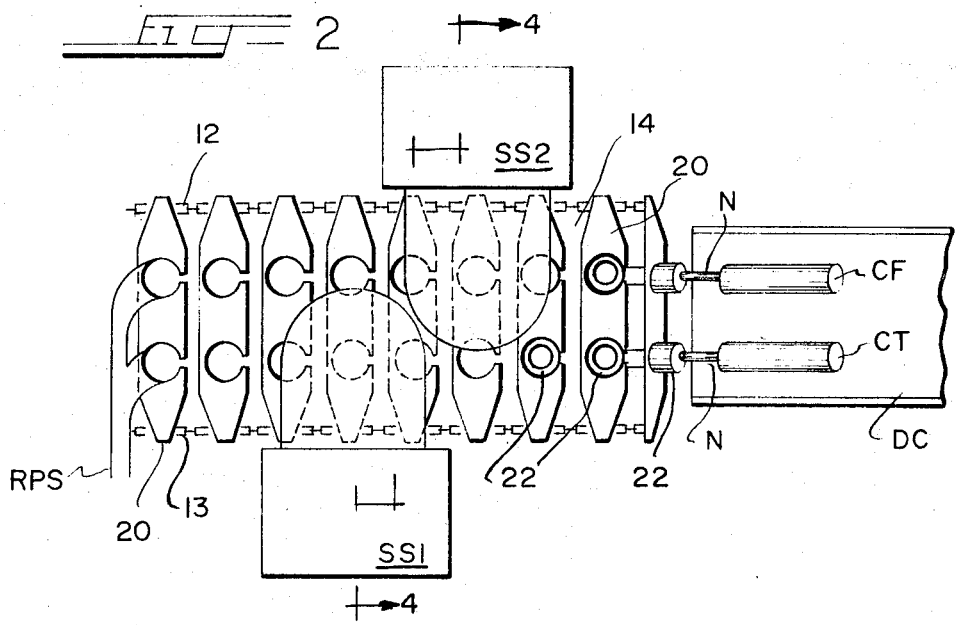
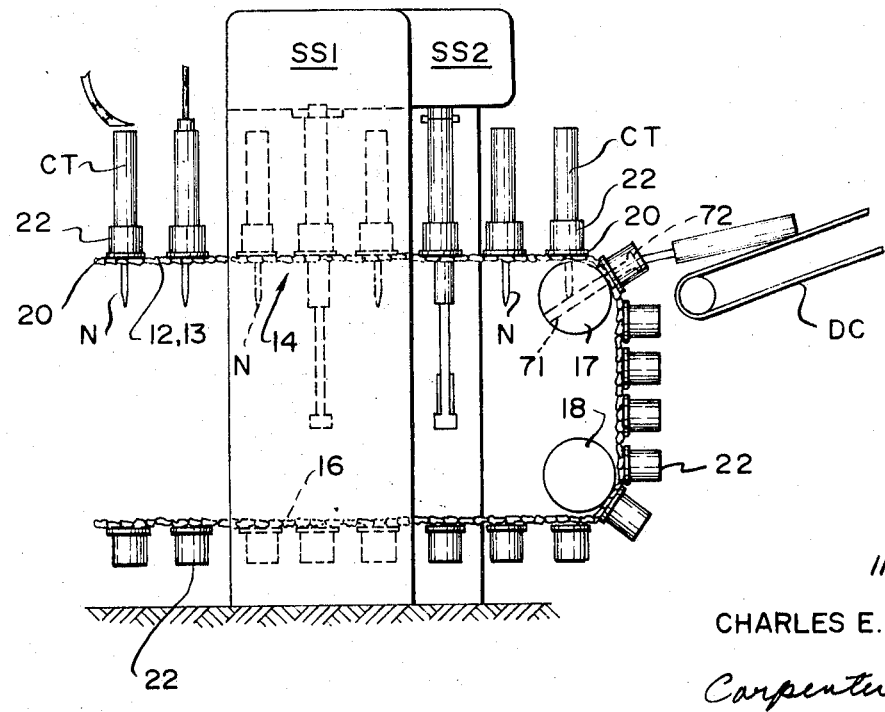

CAULKING CARTRIDGE FILLING AND SEAMING MACHINE

This is a continuation of application Ser. No. 83,820, filed Oct. 26, 1970 and now abandoned.

SUMMARY OF THE INVENTION

The structure according to the present invention makes it possible to load and seal caulking cartridges in a single compact machine consisting of a conveyor having the cartridge tubes movable in a pair of side-by-side rows, each row being filled, seamed and discharged from the machine.

THE DRAWINGS

FIG. 1 is a rear elevational view of a cartridge filling and seaming machine according to the present invention;

FIG. 2 is a schematic plan view showing the relationship of an opposed pair of seamer stations with respect to a conveyor for moving cartridge tubes in a pair of side-by-side rows;

FIG. 3 is an elevational view thereof; and

FIG. 4 is a schematic elevational view taken substantially along the line 4—4 of FIG. 2 looking in the direction of the arrows.

The improved caulking cartridge filling and seaming machine according to the present invention is denoted generally by the reference numeral 10 and includes a main frame 11 supported by conventional standards, not shown, and extends in a horizontal direction as shown. Frame 11 supports a pair of laterally spaced conveyor chains 12 and 13, constituting a conveyor flight 14 and a return flight 16. The chains 12 and 13 are trained for orbital movement about spaced sprockets 17 disposed at the discharge end of conveyor flight 14 and about a pair of lower sprockets 18 disposed beneath sprockets 17 at one end of the return flight 16 and also about spaced sprockets 19 disposed beneath frame 11 and spaced from sprockets 17. The training of the conveyor chains 12 and 13 is completed about a pair of upper sprockets 21 at the receiving end of the conveyor 14.

The conveyor chains 12 and 13 are spanned by caulk tube receiving flights 20. These are adapted to support caulk tubes CT for movement therewith and tubes CT are supplied from a magazine M. Each tube CT is provided with a delivery nozzle N at one end thereof. Each of the flights 20 is formed with an annular cup 22 having an opening 25 at the bottom thereof (see FIG. 4) through which the nozzle N may extend while the cartridge tubes move with the endless flight conveyor 14.

Structure is provided for moving the endless chains 12 and 13 comprising the endless flight conveyor 14 in step-by-step fashion, and such structure consists of a power source 30 which may be provided with a Geneva-Stop motion device to give intermittent and periodic motion to the spaced drive sprockets 21 for the flight conveyor 14.

Power source 30 is adapted not only to drive the flight conveyor 14 in the step-by-step fashion, but also to control delivery of individual cartridge tubes CT to the cups 22 disposed on the flights 20, raising of the cartridge tubes CT from the cups during seaming of an end retaining ring to the sealed cartridge tube, and ejecting the filled tubes at the delivery end of the conveyor. The power source 30 accordingly has an output power shaft 23 which rotates through one complete cycle during which cycle a pair of tubes CT are loaded in to the cups 22. The power shaft 23 has a cam 24 fast thereto which cooperates with a bell crank 26 pivoted at 27 to a pillow block 28. One arm of the bell crank 26 has a roller cam follower 29 at one end thereof, the other arm of the bell crank 26 being pivotally connected at 31 to a link 32. It in turn is pivotally connected at 33 to one end of rock arm 35 turning on a dead shaft 34 mounted on a pillow block 36 secured to the underside of a frame member 37 extending longitudinally of the machine 10, underneath the frame 11 and in spaced relationship with respect thereto.

A cartridge tube delivery arm 38 is mounted on the dead shaft 34 for rocking movement with the rock arm 35, and distal end of arm 38 is pivotally connected to a link 39 in turn connected to a cartridge tube pusher 41 mounted for sliding movement on a guide 42 formed as part of the magazine M. There are a pair of such cartridge tube pushers 41 mounted in side-by-side relationship and each has a pusher member 43 extending therefrom adapted to engage the bottommost cartridge tube CT disposed in the magazine M, and arranged to push the cartridge tube CT into the cup 22 with the nozzle end N thereof protruding through the hole 25 in the bottom of cup 22.

The double row of cartridge tubes CT move in step-by-step fashion with the flight conveyor 14 past a filling station FS including a filling nozzle 44 at the lower end thereof. A filling mechanism FM is adapted to control the metering of a charge of caulking material held in a hopper H as part of the filling station FS to meter and discharge a quantity of caulking material into the tube CT.

Structure is provided in the filling station FS beneath the conveyor flight 14 for raising the cartridge tubes CT against a stop collar 46, and such structure includes a lifting rod 47 which is timed in its operation with the rotation of the shaft 23 to raise the unfilled cartridge tubes CT against the stop collar 46.

The cartridge tubes CT, after being filled at the filling station FS, then move in step-by-step fashion with the individual flights 20 past a ring and plunger station RPS where the open tops of the cartridge tubes are fitted with a piston plunger P and the upper rim of the tube is fitted with a ring R subsequently to be crimped about the upper open end of the cartridge tube to provide a stop for rings R and plungers P. Details of such structure form no part of the present invention, and accordingly are not shown in detail.

The cartridge tubes CT with the ring and plunger placed thereon move in the aforesaid fashion past a pressing station PS where the plungers P are pressed into the tubes CT and where the ring R is pressed against the top opening of the cartridge tubes CT.

After the tubes are fitted with plunger P and ring R, one row of tubes moves to a first seamer station SS1 while the other row moves to position at a second seamer station SS2. The two seamer stations SS1 and SS2 are identical except that seamer station SS2 is displaced longitudinally downstream from seamer station SS1.

Structure is provided at each of the seamer stations for raising the cartridge tubes from the cups 22 and holding same in vertical position for seaming, such structure being timed in its operation with the rotation of the power output shaft 23 of the power source 30.

The structure for raising the tubes CT from the cups 22 is best seen with respect to FIG. 4, and consists of a push rod 48 having a hollow cylindrical pusher member 49 mounted at the other end thereof. The latter is adapted to enter the opening 25 in the bottom of the cup 22 to push the cartridge tubes CT against a seaming chuck SC which crimps the ring about the upper end of the tubes CT. Push rod 48 is guided in a bearing block support 51 mounted on frame members 52 of the seamers SS1 and SS2.

The power source 30 is arranged to control the movement of the push rods 48 in effecting a movement of the filled cartridge tubes CT against the seamer chucks SC, and to this end the rock arm 35 is pivotally connected at 53 to a long rigid link 54 pivotally connected at 56 to a rock arm 57 fast to a shaft 58 mounted in a pillow block 59 adjacent to the delivery end of the flight conveyor 14 and disposed therebelow. Shaft 58 has a rock arm 59 fast thereto, and the rocking movement thereof causing longitudinal movement of a link 61 pivoted at 62 to the distal end of the arm 59.

Link 61 has the other end thereof pivotally connected at 63 to a bell crank 64 shown schematically in FIG. 1 and seen more clearly in FIG. 4. Bell crank 64 is pivotally mounted at 66 to a support block 67. The end of the bell crank 64 remote from its connection to the link 61 is pivotally connected at 68 to the push rod 48 seen in FIG. 4.

It may be noted at this point that since the two seaming stations SS1 and SS2 are displaced from each other longitudinally on a flight conveyor 14, that the dimensions of the structure for effecting raising of the cartridge tubes CT from their cups 22 must be changed according to the displacement of the two seaming stations SS1 and SS2. Such changes in dimensions are within the skill of one in the art and accordingly seem unnecessary to be described in detail.

When the cartridge tubes CT are thus filled and seamed as described they move in side-by-side relationship to the discharge end of the conveyor 14 where they move onto a discharge conveyor DC seen in FIG. 2. In order to provide for discharge of the filled tubes onto the discharge conveyor, structure is provided for ejecting the tubes from their cups 22, and the structure for placing the tubes in the cups 22 and seaming the same is also employed for effecting the discharge of the tubes from the cups.

Accordingly, the distal end of the rock arm 59 has an ejector rod 71 connected thereto, the distal end of the ejector rod 71, see also FIG. 3, terminating in a cylindrical flattened end 72 adapted to bear against the underside of the tube CT to push the same from the cup 22 when in the position seen in FIG. 3.

I claim:

1. In a machine for filling cartridge tubes, each of said cartridge tubes having an elongated discharge nozzle extending from an end thereof:
    a. an endless conveyor supported for orbital movement in step-by-step fashion including power means for driving said conveyor;
    b. means on said endless conveyor for supporting said cartridge tubes by the discharge nozzle thereof for movement therewith in a pair of side-by-side rows;
    c. means for loading empty cartridge tubes into said last named means for subsequent filling thereof;
    d. filling means for said cartridge tubes disposed downstream from where said tubes are loaded onto said conveyor;
    e. means for placing piston and ring means at the end of said filled tube remote from the place of support on said conveyor;
    f. first and second seaming means for seaming said ring means to the said ends of said cartridge tubes;
        i. said first seaming means being disposed at the side of said conveyor and being operable upon the tubes supported thereon in one of said rows only;
    g. means engaged with said discharge nozzles for removing filled and seamed tubes from said conveyor;
    h. means operable by said power means for synchronizing the operation of said loading means, said first and second seaming means and said cartridge tube removing means.

2. A machine according to claim 1 wherein said seaming means includes means engageable with said tube for raising said cartridge tube from said cartridge tube supporting means during seaming of said tubes.

3. A machine according to claim 1 wherein said means operated by said power means includes a cam operable by said power means and cam follower members operated by said cam operable to control said loading means, said seaming means and said cartridge tube removing means.

4. In a machine for filling and seaming cartridge tubes, each of said cartridge tubes having an elongated discharge nozzle extending from an end thereof:
    a. an endless conveyor supported for orbital movement in step-by-step fashion including power means for driving said conveyor;
    b. means on said endless conveyor for supporting said cartridge tubes by the discharge nozzles thereof for movement therewith;
    c. means for loading empty cartridge tubes into said last named means for subsequent filling thereof;
    d. filling means for said cartridge tubes disposed downstream from where said tubes are loaded onto said conveyor;
    e. means for placing piston and ring means at the end of said filled tube remote from its place of support on said conveyor;
    f. seaming means for seaming said ring means to the said ends of said cartridge tubes;
    g. means engaged with the discharge nozzle of a filled and seamed cartridge tube for removing said tube from said conveyor;
    h. means operable by said power means for synchronizing the operation of said loading means, said seaming means and said cartridge tube removing means.

5. In a machine according to claim 4 wherein said seaming means includes means engageable with said cartridge tube for raising said cartridge tube from said cartridge tube supporting means during seaming of said cartridge tube.

6. In a machine according to claim 4 wherein said conveyor comprises flights having apertures therein for receiving the discharge nozzles of said cartridge tubes.

7. In a machine according to claim 6 wherein said seaming means includes means engageable with said cartridge tube and including means for raising said cartridge tube by movement in the apertures of said conveyor flights.

* * * * *